United States Patent
Watanabe et al.

(10) Patent No.: US 10,459,669 B2
(45) Date of Patent: Oct. 29, 2019

(54) PRINTER AND CONTROL METHOD OF A PRINTER

(71) Applicant: SEIKO EPSON CORPORATION, Tokyo (JP)

(72) Inventors: Kei Watanabe, Saku (JP); Yuki Yajima, Chikuma (JP); Eri Iiyama, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/201,004

(22) Filed: Nov. 27, 2018

(65) Prior Publication Data
US 2019/0163412 A1  May 30, 2019

(30) Foreign Application Priority Data
Nov. 28, 2017  (JP) ................................. 2017-228031

(51) Int. Cl.
*G06K 15/00* (2006.01)
*G06F 3/12* (2006.01)

(52) U.S. Cl.
CPC ............ *G06F 3/121* (2013.01); *G06F 3/1234* (2013.01); *G06F 3/1243* (2013.01); *G06F 3/1267* (2013.01)

(58) Field of Classification Search
None
See application file for complete search history.

(56) References Cited

U.S. PATENT DOCUMENTS

| 5,857,065 A | 1/1999 | Suzuki | |
|---|---|---|---|
| 5,982,506 A * | 11/1999 | Kara | G06Q 20/389 358/405 |
| 6,618,162 B1 * | 9/2003 | Wiklof | G06F 9/4415 358/1.15 |
| 7,707,349 B1 * | 4/2010 | Keithley | G06F 13/385 358/1.1 |

FOREIGN PATENT DOCUMENTS

JP          08-300772 A     11/1996

* cited by examiner

*Primary Examiner* — Dov Popovici
(74) *Attorney, Agent, or Firm* — Foley & Lardner LLP (57) ABSTRACT

A printer including: a printhead; and a processor that controls the printhead. The processor, when data including print data of one transaction is received from an external device, acquires from the received data the print data and a first error detection code the external device calculated from the print data, calculates a second error detection code from the acquired printer, determines whether or not the first error detection code and the second error detection code match, and sends to the external device evaluation result data indicating the evaluation result. When the first error detection code and second error detection code match, the processor prints by the printhead based on the acquired print data; and when first error detection code and second error detection code do not match, discards the received data.

12 Claims, 4 Drawing Sheets

PRINTER AND CONTROL METHOD OF A PRINTER

BACKGROUND

1. Technical Field

The present invention relates to a printer and a control method of a printer.

The present invention claims priority to Japanese Application No. 2017-228031 filed on Nov. 28, 2017 which is hereby incorporated by reference in its entirety.

2. Related Art

As soon as data is received, printers typically interpret the received data and execute a printing process. As a result, when the print data is interrupted while processing a transaction, the data received by that time has already been printed, and printing stops in the middle of the transaction. A transaction as used here means printing a single page or a single document.

Furthermore, because printers of the related art cannot detect errors when there is an error in the received print data, print data containing an error cannot be discarded, and printing continues using the erroneous print data.

As an example of technology for preventing print data reception errors, JP-A-H8-300772 teaches a printer having a data communication display device for displaying the reception state of print data sent from a personal computer. This data communication display device receives print data segmented into multiple packets one packet at a time, and determines whether or not each packet has been correctly received by the checksum of each received packet. If a packet was correctly received, the print data in that packet is output to the printer.

However, print data divided into multiple packets is output to and printed by a printer according to the related art packet by packet. As a result, while reception errors of print data packets can be avoided, if a communication error occurs before the last block is received, printing will still be interrupted without completely printing all of the print data (that is, without printing the complete transaction).

SUMMARY

An object of the present invention is to prevent using print data in which a reception error has occurred and assure more reliable printing by a printer without stopping the printing operation in the middle of a transaction.

One aspect of the invention is a printer including: a printhead; and a processor configured to execute; acquiring the print data and a first error detection code calculated from the print data by an external device, when data including print data of one transaction is received from the external device, calculating a second error detection code from the acquired print data, determining whether or not the first error detection code and the second error detection code match, sending to the external device evaluation result data indicating the evaluation result, printing by the printhead based on the acquired print data when the first error detection code and the second error detection code match, and discarding the received data when the first error detection code and the second error detection code do not match.

This aspect of the invention verifies whether or not the print data of one transaction was correctly received based on a first error detection code received with the print data, and a second error detection code calculated from the received print data. As a result, using print data in which a reception error occurred can be prevented, and more reliable printing is possible, without ending the printing operation in the middle of a transaction.

A printer according to another aspect of the invention also has a first buffer configured to store the data received from the external device; and a second buffer configured to store the print data acquired from the received data; the processor configured to execute; acquiring the print data and the first error detection code from the data stored in the first buffer, and, sending the print data to the second buffer and printing by the printhead when the first error detection code and the second error detection code match.

This aspect of the invention improves the throughput of the printing process because newly received print data can be stored in the first buffer and verified in the verification process while printing the print data transferred to the second buffer.

In another aspect of the invention, the evaluation result data expresses the evaluation result by a continuous data train of a specific length or longer.

Even if there is an error in part of the received evaluation result data, the external device can correctly determine the result of the verification process on the printer from the most numerous symbol in the evaluation result data.

In another aspect of the invention, the processor sends to the external device the evaluation result data based on the data received from the external device until receiving a resend request, when the resend request for the evaluation result data is received from the external device.

As a result, the external device can cause the printer to resend the evaluation result when the evaluation result data sent from the printer could not be received because the external device was busy, for example. Print data is therefore not lost, and the external device can continue printing with high reliability.

In another aspect of the invention, when a disable command instructing to disable the verification process is received from the external device, the processor does not execute the verification process on the data received from the external device after receiving the disable command, and prints based on all the received data as the print data.

Thus comprised, the printer can execute the same printing process as a conventional printer that does not execute a verification process.

In another aspect of the invention, when a query asking if the printer has the function of a verification process is received from the external device, the processor sends to the external device a response indicating that the printer has the function of a verification process.

In this configuration, the external device can determine if the destination printer has a verification process function, and whether or not the verification process function of the printer is enabled, before sending print data. As a result, the external device can avoid errors such as adding and sending a first error detection code with the print data to a conventional printer that does not have a verification function, or to a printer in which the verification is disabled. As a result, the external device can execute print jobs smoothly.

Another aspect of the invention is a control method of a printer, including: receiving data including print data of one transaction from an external device; acquiring the print data and a first error detection code calculated from the print data by the external device; calculating a second error detection code from the acquired print data, and determining whether or not the first error detection code and the second error detection code match; sending to the external device evaluation result data indicating the evaluation result; printing based on the extracted print data of the one transaction when the first error detection code and second error detection code match; and discarding the received data when first error detection code and second error detection code do not match.

This aspect of the invention verifies whether or not the print data of one transaction was correctly received based on a first error detection code received with the print data, and a second error detection code calculated from the received print data. As a result, using print data in which a reception error occurred can be prevented, and more reliable printing is possible, without ending the printing operation in the middle of a transaction.

A control method according to another aspect of the invention further includes: storing the data received from the external device in a first buffer; acquiring print data and the first error detection code calculated from the print data by the external device; sending the print data to a second buffer when the first error detection code and the second error detection code match; and printing based on the sent print data.

This aspect of the invention improves the throughput of the printing process because newly received print data can be stored in the first buffer and verified in the verification process while printing the print data transferred to the second buffer.

In a control method according to another aspect of the invention, the evaluation result data is a continuous data train of a specific length or longer.

Even if there is an error in part of the received evaluation result data, the external device can correctly determine the result of the verification process on the printer from the most numerous symbol in the evaluation result data.

In a control method according to another aspect of the invention, when a resend request for the evaluation result data is received from the external device, sending to the external device the evaluation result data based on the data received from the external device until receiving the resend request.

As a result, the external device can cause the printer to resend the evaluation result when the evaluation result data sent from the printer could not be received because the external device was busy, for example. Print data is therefore not lost, and the external device can continue printing with high reliability.

In a control method according to another aspect of the invention, when a disable command instructing to disable the verification process is received from the external device, not executing the verification process on the data received from the external device after receiving the disable command, and printing based on all the received data as the print data.

Thus comprised, the printer can execute the same printing process as a conventional printer that does not execute a verification process.

In a control method according to another aspect of the invention, when a query asking if the printer has the function of a verification process is received from the external device, sending to the external device a response indicating that the printer has the function of a verification process.

In this configuration, the external device can determine if the destination printer has a verification process function, and whether or not the verification process function of the printer is enabled, before sending print data. As a result, the external device can avoid errors such as adding and sending a first error detection code with the print data to a conventional printer that does not have a verification function, or to a printer in which the verification is disabled. As a result, the external device can execute print jobs smoothly.

Other objects and attainments together with a fuller understanding of the invention will become apparent and appreciated by referring to the following description and claims taken in conjunction with the accompanying drawings.

DESCRIPTION OF EMBODIMENTS

An embodiment of the invention is described below with reference to the accompanying figures.

A printer according to this embodiment of the invention has a reception data verification function that determines whether or not print data for one transaction received from an external device was correctly received. This printer enables and disables the reception data verification function based on a command sent from the external device. As described above, a transaction is a printing unit such as one page or one document. For example, the print data for one transaction in a receipt paper, which is an example of a printer for a specific application, is the print data for one receipt, and the print data for one transaction in a ticket printer is the print data for one ticket.

Figure 1:
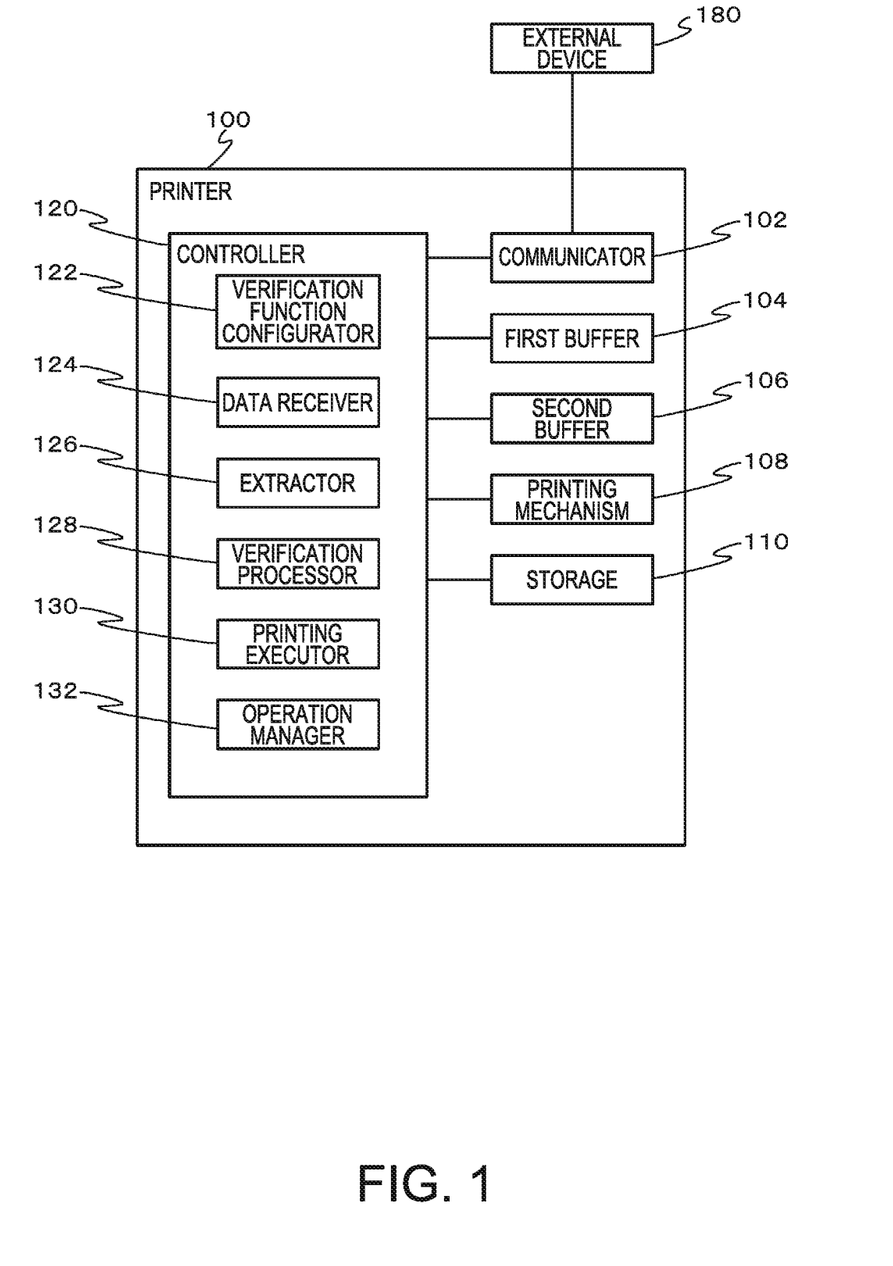
FIG. 1 is a block diagram illustrating the configuration of a printer according to a preferred embodiment of the invention.

FIG. 1 is a block diagram illustrating the configuration of a printer 100 according to this embodiment. The printer 100 has a communicator 102 that handles data communication with an external device 180, and a first buffer 104 and second buffer 106 that store reception data. The printer 100 also has a printing mechanism 108 used to print on a print medium based on print data received from the external device 180, storage 110 for storing data required for printer 100 operation, and a controller 120 that controls printer 100 operation.

The communicator 102 (transceiver, communication circuit) is a communication interface through which data is sent and received with the external device 180, and in this example is a USB controller that handles communication by USB (Universal Serial Bus). The first buffer 104, second buffer 106, and storage 110 are embodied by semiconductor memory in this example.

When the printing mechanism 108 uses an inkjet printing method, the printing mechanism 108 includes a printhead that ejects ink onto paper, a scanning mechanism that moves the printhead over the paper, and a conveyance mechanism that conveys the paper, and when a thermal (direct thermal) printing method is used, the printing mechanism 108 includes a thermal head that applies heat to thermal paper and a conveyance mechanism that conveys the paper, for example.

The controller 120 is a control circuit with a processor such as a CPU (Central Processing Unit). The controller 120 may also include ROM (read-only memory) storing a program, and RAM (random access memory) for temporarily storing data. Functional elements (function units) of the controller 120 include a verification function configurator 122, a data receiver 124, a extractor 126, a verification processor 128, a printing executor 130, and an operation manager 132.

These functional elements of the controller 120 are embodied by, for example, the controller 120, which is a computer, reading a program from memory and executing the program. The computer program may be stored on a suitable computer-readable memory device.

Alternatively, all or part of the functional elements of the controller 120 may be embodied by hardware devices including one or more electronic circuit parts.

When the printer 100 power turns on, the verification function configurator 122 sets a verification function flag used to enable and disable the reception data verification function to 1 (initializes the flag) and enables the verification function. The verification function flag is stored in storage 110, for example. In response to receiving a disable verification function command or an enable verification function command from the external device 180, the verification function configurator 122 sets the verification function flag to 0 (disabled) or 1 (enabled).

The data receiver 124 transfers from the communicator 102 and stores in the first buffer 104 reception data the communicator 102 received from the external device 180. When the communicator 102 receives the first data in a continuous stream of data sent from the external device 180, the data receiver 124 uses a timer (not shown in the figure) of the controller 120 to start counting the time past since the first data was received. When the time past reaches a specific time that is sufficient to receive the reception data including all print data for one transaction, for example, the data receiver 124 stops the transfer process of reception data from the communicator 102 to the first buffer 104. When the data receiver 124 stops the transfer process of reception data from the communicator 102 to the first buffer 104, the data receiver 124 reports stopping data transfer to the extractor 126 and operation manager 132. As a result, the extractor 126, and the verification processor 128, which operates using output from the extractor 126, execute a process in response to receiving reception data including the print data for one transaction.

When transferring reception data from the communicator 102 to the first buffer 104, the data receiver 124 determines whether or not a verification function query command is included in the reception data being transferred. If a verification function query command is included in the reception data, the data receiver 124 reports to the operation manager 132 that a verification function query command was received.

A verification function query command is a command asking whether or not the printer 100 has the ability to execute a verification process (has a reception data verification function). The external device 180 sends the verification function query command to the printer 100 before sending data to the printer 100.

When the operation manager 132 receives from the data receiver 124 a report that a verification function query command was received, the operation manager 132 responds through the communicator 102 to the external device 180 that the reception data verification function is enabled if the verification function flag is set to 1 (enabled). If the verification function flag is set to 0 (disabled), the operation manager 132 responds to the external device 180 that the reception data verification function is disabled.

If a response that the reception data verification function is enabled, or a response that the reception data verification function is disabled, the external device 180 at least knows that the printer 100 has a reception data verification function. That is, both a response that the reception data verification function is enabled, and a response that the reception data verification function is disabled, are responses indicating that the printer 100 has a verification function. Because a printer that does not have a reception data verification function cannot send an appropriate response to a verification function query command, the external device 180 can also know that the printer 100 does not have a reception data verification function.

When a response indicating that the reception data verification function is enabled is received from the printer 100, the external device 180 stores information indicating the same (that the reception data verification function of the printer 100 is enabled). The external device 180 then sends data including a first error detection code to the printer 100. In this embodiment, the external device 180 adds a first error detection code to all data (commands and print data) except for the enable verification function command and verification function query command described above. For example, the external device 180 sends print execution data including the print data for one transaction and a first error detection code.

Figure 2:
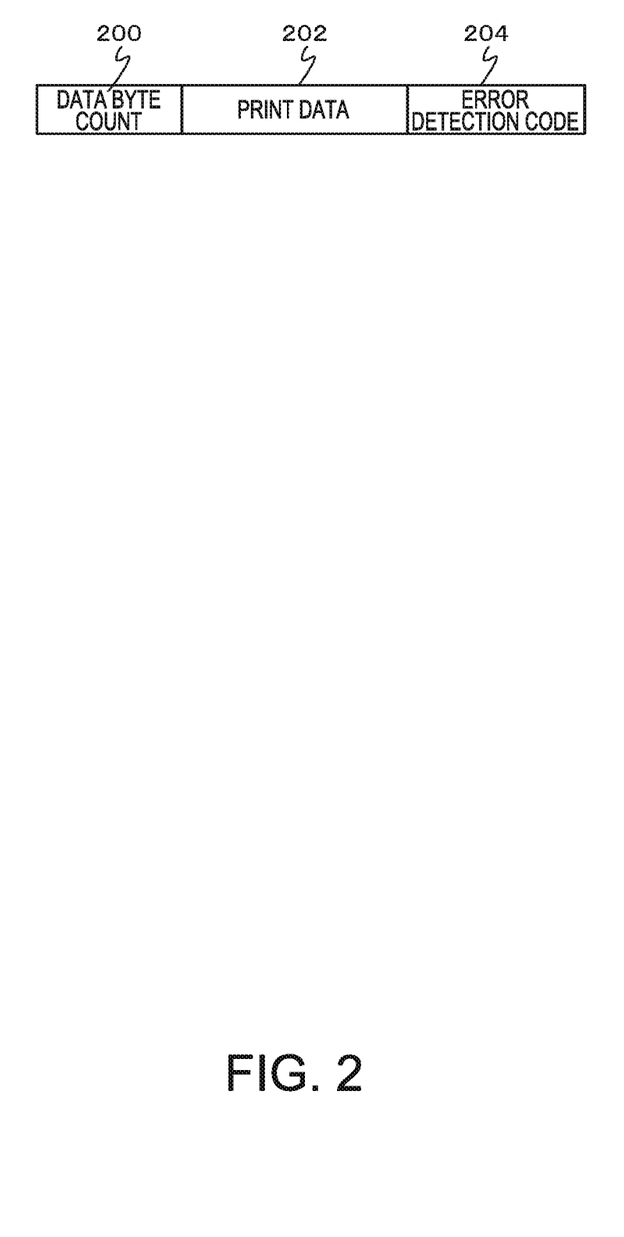
FIG. 2 shows an example of the configuration of print execution data received from an external device.

FIG. 2 shows an example of the configuration of print execution data the external device 180 sends. The print execution data shown in this example includes a data byte count field 200, print data field 202, and error detection code field 204. The data byte count field 200 is, for example, a two-byte fixed length field, and stores the total number of bytes in the print data field 202 and error detection code field 204. The print data field 202 is a variable length field, and stores the print data for one transaction. The error detection code field 204 is, for example, a two-byte fixed length field, and stores the first error detection code the external device 180 calculated for the print data stored in the print data field 202. In this embodiment, the first error detection code is a checksum for the print data stored in the print data field 202.

As described above, the external device 180 adds and sends a first error detection code with all commands. For example, as with the print execution data shown in FIG. 2, the external device 180 sends command data including the data byte count, command code, and first error detection code to the printer 100.

When the verification function flag is set to 1 (enabled), the extractor (acquirer) 126 extracts (acquires) the print data and first error detection code from the print execution data stored in the first buffer 104. For example, the extractor 126 extracts, as the print data and first error detection code, the data of the parts of the reception data stored in the first buffer 104 corresponding to the print data field 202 and error detection code field 204 in FIG. 2. The extractor 126 then passes the extracted print data and first error detection code to the verification processor 128.

If the verification function flag is set to 0 (disabled), the extractor 126 transfers (sends) and stores in the second buffer 106 all reception data stored in the first buffer 104. As a result, when the verification function flag is set to 0, all reception data received by the communicator 102 is stored in the second buffer 106. As a result, when the verification function flag is set to 0, the operation manager 132 and printing executor 130 operate in the same way as a printer according to the related art that does not have a reception data verification function based on all of the reception data stored in the second buffer 106. In this case, the second buffer 106 corresponds to the receive buffer in a conventional printer.

To change the reception data verification function of the printer 100 from disabled to enabled, the external device 180 sends an enable verification function command. Because the printer 100 receives an enable verification function command when the reception data verification function is disabled, the command is transferred from the first buffer 104 to the second buffer 106, and the operation manager 132 changes the reception data verification function to enabled in response to the enable verification function command stored in the second buffer 106.

When the verification function flag is set to 1 (enabled), the verification processor 128 executes the verification process and applies the reception data verification function. For example, when the received data is print execution data, the verification processor 128 calculates a second error detection code from the print data the extractor 126 extracts, and determines whether or not the calculated second error detection code and the first error detection code the extractor 126 extracted match. Like the first error detection code, the second error detection code in this example is the extracted checksum of the print data.

The first error detection code and second error detection code matching in the verification process is also referred to as the error detection codes matching or the verification result being normal, and the first error detection code and second error detection code not matching in the verification process is also referred to as an error detection code mismatch or the verification result being abnormal.

The verification processor 128 stores data indicating the result of the decision in the verification process in the storage 110, and sends evaluation result data 302 indicating the result of the decision to the external device 180. The evaluation result data 302 in this example is a continuous data train of a specific number or more of data expressing the result of the decision.

Figure 3:
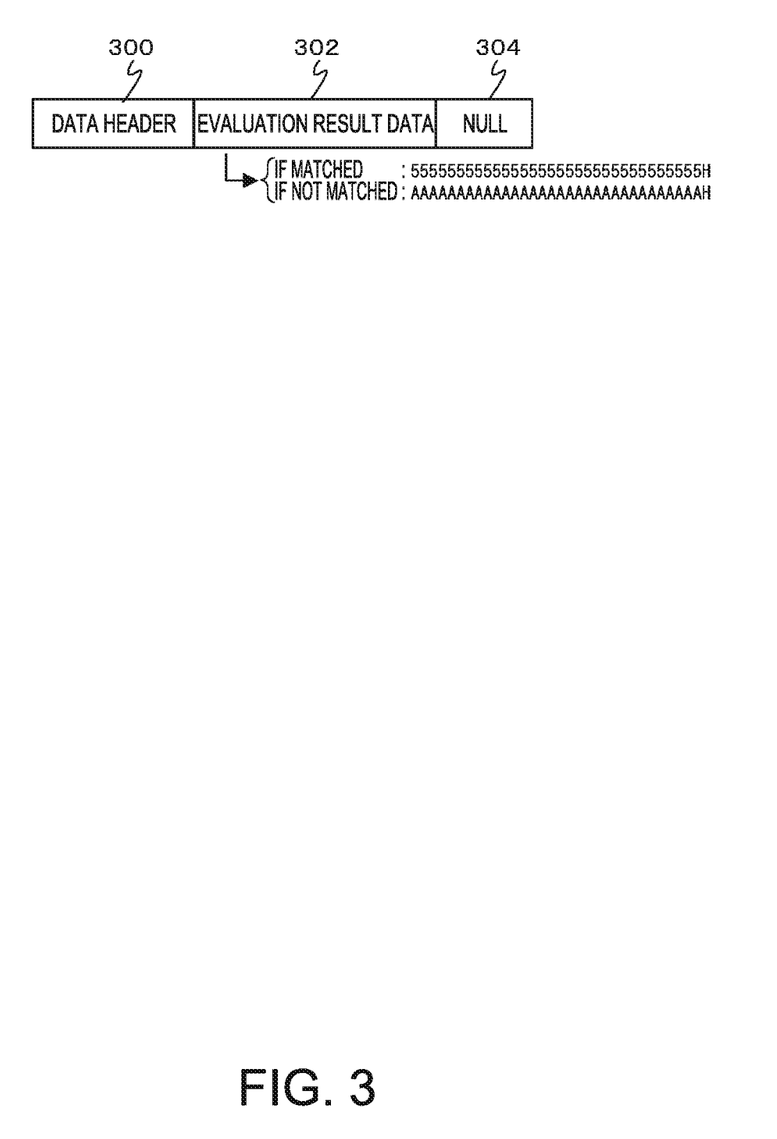
FIG. 3 shows an example of decision result data sent to the external device.

FIG. 3 shows an example of the configuration of evaluation result data 302. In this example, the evaluation result data 302 is a sixteen byte fixed-length value (symbol) bracketed by a one-byte fixed-length data header 300 and a one-byte fixed-length null code 304. When the error detection codes match (when the verification result is normal), the evaluation result data 302 is a continuous data train of sixteen 55H values indicating the error detection codes match. When the error detection codes do not match (when the verification result is not normal), the evaluation result data 302 is a continuous data train of sixteen AAH values indicating an error detection code mismatch. By using a continuous train of multiple identical values, 55H and AAH, the external device 180 can determine the evaluation result of the printer 100 even if part of the data is damaged for some reason. Note that H indicates the values 55 and AA are hexadecimal values.

When the evaluation result is normal, the verification processor 128 sends the print data the extractor 126 extracted to the second buffer 106. When the evaluation result is not normal, the verification processor 128 discards the extracted print data without sending it to the second buffer 106.

As described above, the operation manager 132 sends a response indicating whether the reception data verification function is enabled or disabled to the external device 180 based on the value of the verification function flag stored in the printer 100 in response to receiving notice from the data receiver 124 that a verification function query command was received.

When the verification function flag is set to 1 (enabled), the operation manager 132 instructs the printing executor 130 to print based on the print data stored in the second buffer 106 in response to the print data being transferred by the verification processor 128 to the second buffer 106. As a result, using print data in the second buffer 106 verified to have been correctly received, the printer 100 can print a complete transaction without interruption.

However, if the verification function flag is 0 (disabled), the operation manager 132 determines whether or not the data transferred to the second buffer 106 includes a command instructing an operation other than printing, such as a firmware upgrade command. If there is a command instructing an operation other than printing, the operation manager 132 executes the operation instructed by the command. If there is not a command instructing an operation other than printing, the operation manager 132 instructs the printing executor 130 to print using the data (print data) in the second buffer 106. As a result, the printer 100 can print in the same way as a conventional printer that does not have a verification function, and can execute processes such as firmware upgrades using schemes established for conventional printers.

As a result, when the verification function flag is 0, the printer 100 can operate in the same way as a conventional printer that does not have a verification function. More specifically, the printer 100 can receive commands used by conventional printers and print data divided into multiple packets, and upgrade printer firmware or print based on individual print data packets.

When the verification function flag is set to 1 (enabled) and a resend evaluation result data request is received from the external device 180, the operation manager 132 sends the evaluation result data 302 for the last verification process to the external device 180. More specifically, the operation manager 132 determines whether or not the reception data in the second buffer 106 contains a resend evaluation result data request. If it includes a resend evaluation result data request, the operation manager 132 generates evaluation result data 302 using data indicating the evaluation result the verification processor 128 stored in the storage 110 in the last verification process (the verification process applied to the reception data before the resend evaluation result data request). The operation manager 132 then sends through the communicator 102 to the external device 180 a response including the generated evaluation result data 302.

Note that the extractor 126 and verification processor 128 execute the same process on the command data as the process applied to the print execution data as described above. The extractor 126 extracts the command data and first error detection code from the command data stored in the first buffer 104. The verification processor 128 then calculates the second error detection code from the command data extracted by the extractor 126, determines whether or not the second error detection code matches the first error detection code extracted by the extractor 126, and sends the evaluation result data 302 to the external device 180. Command data for which the verification result is normal is sent to the second buffer 106, and command data for which the verification result is not normal is discarded. When the verification result is normal, the operation manager 132 resends the last evaluation result data 302 in response to a resend evaluation result data request.

The external device 180 can reliably receive the evaluation result data by requesting resending even when the evaluation result data, which is the verification result of the last transmitted print data, could not be received from the printer 100 because the external device 180 was busy, for example. Based on the received evaluation result data, the external device 180 sends the print execution data for the next transaction if the verification result is normal, and if the verification is not normal, can resend the print execution data for the last transaction.

In other words, each time the external device 180 sends print execution data (that is, print data for one transaction) to the printer 100, the external device 180 confirms whether or not the print data for that transaction was correctly received, and can reliably execute the print job.

The printing process of the printer 100 when the reception data verification function is enabled (that is, when the verification function flag is set to 1) is described next with reference to the flow chart in FIG. 4. This process starts when the printer 100 power turns on, and ends when the power turns off.

When the process starts, the data receiver 124 determines whether or not the communicator 102 received data (S100), and if not (S100, NO), returns to step S100 and waits until data is received. If the communicator 102 received data (S100, YES), the data receiver 124 starts counting the time past since data was received (that is, the time past since data reception started) by means of a counter (not shown in the figure) of the controller 120 (S102). The data receiver 124 then starts process transferring data from the communicator 102 to the first buffer 104 (S104). In this transfer process, each time reception data is stored in a buffer (not shown in the figure) of the communicator 102, the reception data is read from the buffer and transferred to the first buffer 104.

The data receiver 124 also determines whether or not the reception data transferred from the communicator 102 to the first buffer 104 (that is, the reception data before being stored in the first buffer 104) contains a verification function query command (S106). If a verification function query command is not included (S106, NO), the data receiver 124 determines whether or not the time past since data reception started has reached the specific time (S108). If the reception data being transferred to the first buffer 104 contains a verification function query command (S106, YES), the operation manager 132 sends a query response through the communicator 102 (S110), and then goes to step S108.

Because this printing process is the process executed when the reception data verification function is enabled (that is, when the verification function flag is 1), the response the operation manager 132 sends in step S110 is a response indicating that the reception data verification function is enabled.

In step S108, if the time past has not reached the specific time (S108, NO), the data receiver 124 returns to step S106. As a result, the reception data transfer process from the communicator 102 to the first buffer 104 continues, and the process of determining whether or not a verification function query command is included continues.

However, if in step S108 the time past has reached the specific time (S108, YES), the data receiver 124 ends transfer of reception data from the communicator 102 to the first buffer 104 (S112).

The extractor 126 then extracts the print data and first error detection code from the reception data stored in the first buffer 104 (S114). More specifically, as described above, the extractor 126 the data of the parts of the reception data stored in the first buffer 104 corresponding to the print data field 202 and error detection code field 204 in FIG. 2 as the print data and the first error detection code.

The verification processor 128 then calculates the second error detection code from the extracted print data (S116), and determines whether or not the extracted first error detection code and the calculated second error detection code match (S118). Note that step S116 and S118 are equivalent to a verification process.

If the extracted first error detection code and the calculated second error detection code match (S118, YES), the verification processor 128 outputs evaluation result data 302 indicating the result of the decision that the first error detection code and second error detection code match through the communicator 102 (S120). Next, the verification processor 128 transfers the print data the extractor 126 extracted to the second buffer 106 (S122). The operation manager 132 then instructs the printing executor 130 to print one transaction based on the print data in the second buffer 106 (S124), and then returns to step S100 and repeats the process.

If in step S118 the extracted first error detection code and the calculated second error detection code do not match (S118, NO), the verification processor 128 outputs evaluation result data 302 indicating the result of the decision that the first error detection code and second error detection code do not match (S126). Next, the verification processor 128 discards the reception data stored in the first buffer 104 without transferring it to the second buffer 106 (S128). The verification processor 128 then returns to step S100 and repeats the process.

As described above, the external device 180 sends a verification function query command to the printer 100 before sending data to the printer 100 (before sending print execution data). When the communicator 102 receives the first data byte or data bit (referred to below as data byte or bit) of the verification function query command, step S100 returns YES and receiving the verification function query command sent from the external device 180 starts. The received verification function query command is then stored in the first buffer 104 by the reception data transfer process that starts in step S104.

Because the external device 180 does not start sending print execution data until a response to the verification function query command is received, the reception data transfer process ends in step S112 with only the verification function query command stored in the first buffer 104.

Because the verification function query command does not include an error detection code, if processing then continues from step S114, step S118 will return NO. Then after sending evaluation result data indicating the verification result is not normal (the error detection codes do not match) to the external device 180 in step S126, control returns to step S100 and waits until the next data is received.

In this event, the external device 180 ignores the evaluation result data sent in response to the verification function query command, and based on a response returned in step S110 indicating that the reception data verification function is enabled, starts sending the next print execution data.

Note that when a verification function query command is found in the reception data in step S106, before or after sending a query response in step S110, the verification function query command may be deleted without being stored in the first buffer 104. In this case, the printer 100 can omit processing the verification function query command in steps S112 to S118 and S126, and the external device 180, based on a response returned in step S110 indicating that the reception data verification function is enabled, immediately starts sending the next print execution data.

When the communicator 102 receives the first data byte of the print execution data, step S100 returns YES, and in the process of steps S102 to S112, the print execution data is received and stored in the first buffer 104. Then in step S114 to step S120, the verification process is applied to the received print execution data is, and the received and verified print data is printed in steps S122 and S124.

As described above, a printer 100 according to this embodiment includes a printing mechanism 108, a communicator 102 that exchanges data with an external device 180, and a controller 120. When data including print data for one transaction is received from the external device 180, the controller 120 extracts from the received data the print data and a first error detection code the external device 180 calculated from the print data. The controller 120 then executes a verification process of calculating a second error detection code from the extracted print data, and determining if the first error detection code and second error detection code match. The controller 120 sends evaluation result data 302 indicating the result of the decision to the external device 180, and if the first error detection code and second error detection code match, controls the printing mechanism 108 to print based on the extracted print data for one transaction. However, if the first error detection code and second error detection code do not match, the controller 120 discards the received data.

Whether or not the print data for one transaction was correctly received is determined by a printer 100 applying the control method of a printer according to the invention based on a first error detection code received with the print data and a second error detection code calculated from the print data. As a result, using print data in which a reception error occurred can be prevented, and more reliable printing is enabled without ending the printing operation in the middle of a transaction.

More specifically, a printer 100 according to this embodiment also has a first buffer 104 that stores reception data received from a external device 180, and a second buffer 106 that stores print data extracted from the reception data. The controller 120 extracts print data and a first error detection code from the reception data stored in the first buffer 104, and executes a verification process. When the first error detection code and second error detection code match, the controller 120 transfers the print data to the second buffer 106 and prints with the printing mechanism 108. The print data stored in the second buffer 106 is rendered by a printer driver in the storage 110, and printed by the printing mechanism 108. As a result, the throughput of the printing process can be improved because newly received print data is stored in the first buffer 104 and verified in the verification process while printing the print data transferred to the second buffer 106.

The evaluation result data 302 in the printer 100 is a continuous data train of a specific number or more data indicating the evaluation result. As a result, even if there is an error in part of the received evaluation result data 302, the external device 180 can correctly determine the result of the verification process on the printer 100 from the most numerous symbol in the evaluation result data 302.

In response to receiving a resend request for the evaluation result data 302 from the external device 180, the controller 120 of the printer 100 sends evaluation result data 302 based on the last data received from the external device 180 to the external device 180. As a result, the external device 180 can cause the printer 100 to resend the evaluation result when the evaluation result data 302 sent from the printer 100 could not be received because the external device 180 was busy, for example. Print data is therefore not lost, and the external device 180 can continue printing with high reliability.

When the printer 100 receives a disable command to disable the verification process from the external device 180, the controller 120 does not execute the verification process to data thereafter received from the external device 180. More specifically, reception data received from the external device 180 is transferred directly from the first buffer 104 to the second buffer 106. When the received data is a command, the controller 120 then executes the operation corresponding to the command, and when the received data is print data, prints the print data by the printing mechanism 108. As a result, the printer 100 executes the same printing process as a conventional printer that does not execute a verification process.

When the printer 100 receives a query from the external device 180 asking whether or not the printer 100 has the ability to execute a verification process, the controller 120 sends a response to the external device 180 indicating the printer 100 can execute a verification process. As a result, the external device 180 can determine if the destination printer has a verification process function, and whether or not the verification process function of the printer 100 is enabled, before sending print data. As a result, the external device 180 can avoid errors such as adding and sending a first error detection code with the print data to a conventional printer that does not have a verification function, or a printer 100 in which the verification is disabled. As a result, the external device 180 can execute print jobs smoothly.

The foregoing example describes a specific embodiment of the invention, but the invention is not so limited.

For example, the program executed by the CPU of the controller 120 is not limited to a program stored in ROM or other memory device of the printer 100. For example, the program may be stored on other storage media, recording media, or storage media of an external device, and read and run therefrom by the controller 120.

The external device 180 and printer 100 in the foregoing embodiment communicate by USB, but the invention is not so limited. For example, the external device 180 and printer 100 may communicate by Wi-Fi® or other wireless communication method.

A checksum is used as the first and second error detection codes in the foregoing embodiments, but the invention is not so limited. For example, the first and second error detection codes may be a Cyclic Redundancy Check (CRC) calculated from the print data.

The first error detection code in the foregoing embodiment is applied to print data contained in the print execution data, but may be applied to the data byte count and print data.

Furthermore, the print data contained in the print execution data in the foregoing embodiment is transferred to the second buffer 106, but the data byte count and print data (that is, all data except the first error detection code) may be transferred to the second buffer 106.

Figure 4:
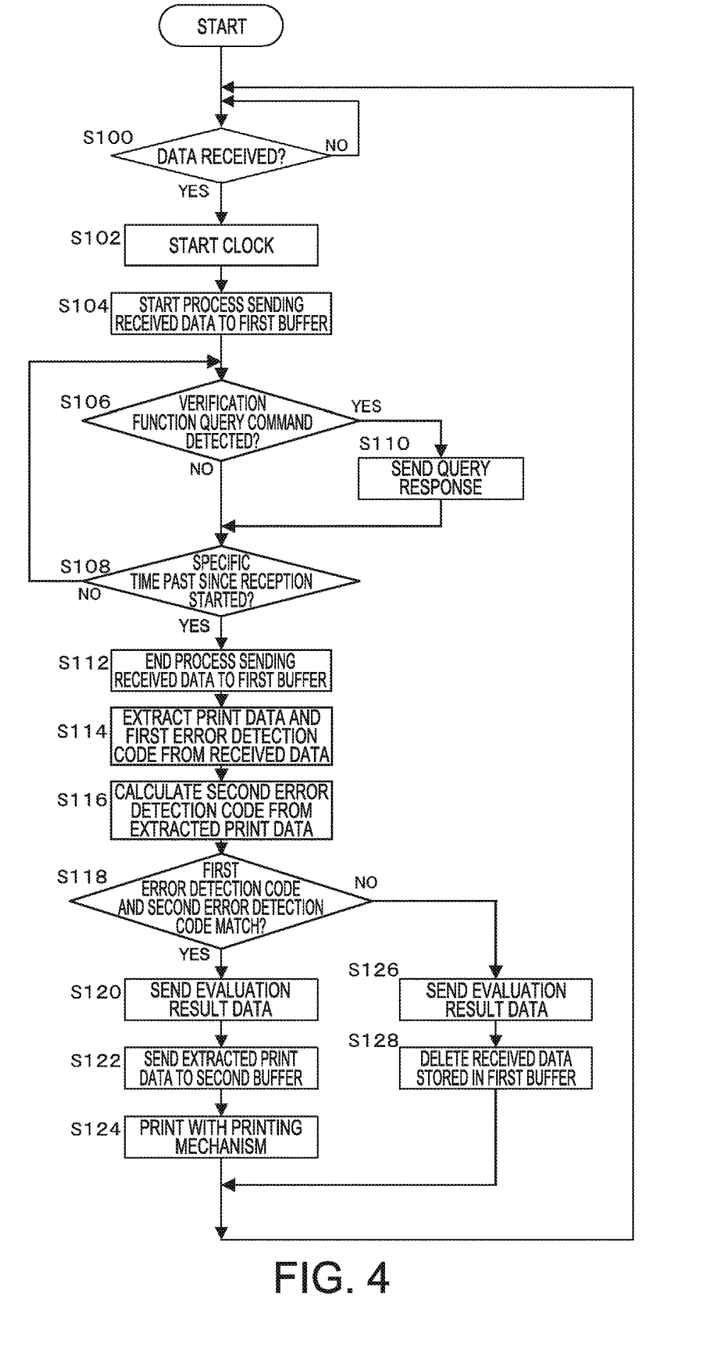
FIG. 4 is a flow chart of a printing process executed when the reception data verification function is enabled.

Furthermore, the order of the processes of the printer 100 shown in the flow chart in FIG. 4 may be changed, or the processes executed in parallel, insofar as such changes do not adversely affect the function.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
   a printhead; and
   a processor configured to execute a verification process that is comprised of:

acquiring print data and a first error detection code calculated from the print data by an external device, when data including print data of one transaction is received from the external device, calculating a second error detection code from the acquired print data, determining whether or not the first error detection code and the second error detection code match, sending to the external device evaluation result data indicating whether or not the first error detection code and the second error detection code match, causing printing by the printhead based on the acquired print data, when the first error detection code and the second error detection code match, and discarding the received data, when the first error detection code and the second error detection code do not match.

2. The printer of claim 1, further comprising:

a first buffer configured to store the data received from the external device; and a second buffer configured to store the print data acquired from the received data;

wherein the processor is configured to;

acquire the print data and the first error detection code from the data stored in the first buffer, and, send the print data to the second buffer and cause printing by the printhead, when the first error detection code and the second error detection code match.

3. The printer of claim 1, wherein:

the evaluation result data is a continuous data train of a specific length or longer.

4. The printer of claim 1, wherein:

the processor is configured to send to the external device the evaluation result data based on the data received from the external device until receiving a resend request, when the resend request for the evaluation result data is received from the external device.

5. The printer of claim 1, wherein:

when a disable command instructing to disable the verification process is received from the external device, the processor is configured to not execute the verification process on the data received from the external device after receiving the disable command, and cause the printhead to print based on the print data received from the external device.

6. The printer of claim 1, wherein:

when a query asking if the printer has a capability of executing the verification process is received from the external device, the processor is configured to send the external device a response indicating that the printer has the capability of executing the verification process.

7. A method of controlling a printer to execute a verification process, comprising:

receiving data including print data of one transaction from an external device;

acquiring the print data and a first error detection code calculated from the print data by the external device;

calculating a second error detection code from the acquired print data, determining whether or not the first error detection code and the second error detection code match;

sending to the external device evaluation result data indicating whether or not the first error detection code and the second error detection code match;

printing based on the extracted print data when the first error detection code and the second error detection code match; and discarding the received data when the first error detection code and the second error detection code do not match.

8. The method of claim 7, further comprising:

storing the data received from the external device in a first buffer;

sending the print data to a second buffer when the first error detection code and the second error detection code match; and printing based on the print data from the second buffer.

9. The method of claim 7, wherein:

the evaluation result data is a continuous data train of a specific length or longer.

10. The method of claim 7, wherein:

when a resend request for the evaluation result data is received from the external device, sending to the external device the evaluation result data based on the data received from the external device until receiving the resend request.

11. The method of claim 7, wherein:

when a disable command instructing to disable the verification process is received from the external device, not executing the verification process on the data received from the external device after receiving the disable command, and printing based on as the print data received from the external device.

12. The method of claim 7, wherein:

when a query asking if the printer has a capability of executing the verification process, sending to the external device a response indicating that the printer has the capability of executing the verification process.

* * * * *